(12) United States Patent
Sharp

(10) Patent No.: US 6,229,229 B1
(45) Date of Patent: May 8, 2001

(54) LIQUID SENSOR FOR DISABLING AN ELECTRICAL DEVICE

(76) Inventor: Terry D. Sharp, 155 Salem Rd., Harrisburg, IL (US) 62946

( * ) Notice: Subject to any disclaimer, the term of this patent is extended or adjusted under 35 U.S.C. 154(b) by 0 days.

(21) Appl. No.: 09/317,745

(22) Filed: May 24, 1999

(51) Int. Cl.⁷ ................................................. H01H 35/18
(52) U.S. Cl. ......................... 307/118; 340/605; 137/312
(58) Field of Search ............................... 361/78, 87, 271, 361/286, 280, 284, 285; 307/112, 116, 118, 125; 340/540, 603–605; 137/312

(56) References Cited

U.S. PATENT DOCUMENTS

| | | | |
|---|---|---|---|
| 3,770,002 | * 11/1973 | Brown | 137/312 |
| 4,020,478 | 4/1977 | Hatfield . | |
| 4,022,598 | 5/1977 | Gucwa, Jr. et al. . | |
| 4,037,427 | 7/1977 | Kramer . | |
| 4,305,420 | * 12/1981 | Nussdorf | 137/312 |
| 4,380,243 | 4/1983 | Braley . | |
| 4,464,582 | 8/1984 | Aragaki et al. . | |
| 4,633,673 | 1/1987 | Morrison et al. . | |
| 4,655,076 | 4/1987 | Weihe et al. . | |
| 4,787,212 | 11/1988 | Hessey . | |
| 4,862,701 | 9/1989 | Small et al. . | |
| 4,937,559 | 6/1990 | Meacham et al. . | |
| 4,984,462 | * 1/1991 | Hass, Jr. et al. | 73/293 |
| 4,998,412 | 3/1991 | Bell . | |
| 5,126,097 | 6/1992 | Weng et al. . | |
| 5,345,775 | 9/1994 | Ridenour . | |
| 5,365,220 | 11/1994 | Rasmason . | |
| 5,402,112 | 3/1995 | Thompson . | |
| 5,522,229 | 6/1996 | Stuchlik, III et al. . | |
| 5,729,990 | 3/1998 | Basse et al. . | |
| 5,755,105 | 5/1998 | Lacoste . | |
| 5,854,518 | 12/1998 | Revis . | |

* cited by examiner

Primary Examiner—Michael J. Sherry
Assistant Examiner—Kim Huynh
(74) Attorney, Agent, or Firm—Senniger, Powers, Leavitt & Roedel

(57) ABSTRACT

A liquid sensor for disabling an electrical device includes upper and lower conductors, each preferably formed of wire mesh tape, separated by a water permeable insulating material such as foam. The electrical device to be disabled when the presence of a liquid is detected is preferably connected to a power source through a circuit breaker, and the upper conductor of the liquid sensor is connected to the same side of the circuit breaker as the electrical device. The lower conductor of the liquid sensor is preferably connected to ground. When water accumulates in the vicinity of the liquid sensor to the point that the water forms an electrical connection between the upper and lower conductors, the sensor will induce an excessive current through the circuit breaker, thus causing the circuit breaker to trip or blow, thus removing power to the electrical device. In one preferred embodiment, the electrical device is a thermostat for a climate control system, where disabling the thermostat will disable the climate control system. The circuit breaker may be resettable or may comprise a replaceable fuse.

12 Claims, 2 Drawing Sheets

LIQUID SENSOR FOR DISABLING AN ELECTRICAL DEVICE

BACKGROUND OF THE INVENTION

1. Field of the Invention

The present invention relates to a system and method for disabling an electrical device upon sensing a predetermined level of liquid and, more particularly, a system and method for disabling a control device, such as a thermostat for a climate control system, upon sensing a predetermined level of liquid, such as water, in the vicinity of the system.

2. Description of the Related Art

It is well known that during normal operation of a climate control system, such as an air conditioner and/or furnace, water is produced through condensation as a result of the heating or cooling process. Such systems are commonly provided with condensate drain lines for channeling and discharging this water into a sewer system, for example. It is possible, however, for such drain lines to become obstructed or clogged over time, thus causing the condensate (i.e., water) to back up in the drain line and ultimately leak or overflow from another location within the climate control system. For example, it is not uncommon for the condensate drain line on an air conditioner to become clogged, thus resulting in the accumulation of water in the drip pan for the air conditioner until the water ultimately spills over the drip pan. When this occurs, the water may run down onto other components of the climate control system that are positioned below the drip pan, such as a heat exchanger and/or an air handler, and this can lead to corrosion and premature failure of those components. Of course, in the case of electrical components, the overflowing water may create a short circuit condition that could result in immediate damage to the component, and may also create a safety hazard.

In addition to damaging various components of the climate control system, the overflowing water may cause damage to wood floors, carpeting, etc. and, in the case of climate control systems located, for example, in attics or on the second story of a multi-level building, the leaking water may also cause damage to ceilings and anything else located around or below the climate control system, including furniture or other personal items.

A variety of devices are known in the art for disabling electrical devices, including climate control systems, upon detecting an undesirable accumulation of water. In general, however, the known devices are relatively expensive, are difficult to manufacture and/or install, and are generally designed for specific applications. In one such device, a secondary drain line is provided within the primary drain line of an air conditioner for draining condensate water into an auxiliary reservoir when the primary drain line becomes clogged. Positioned within the auxiliary reservoir is a float that can rotate about a pivot point in response to rising water within the auxiliary reservoir. A mercury switch is mounted to the float so that electrical power is provided through the switch and to the thermostat (which controls and enables the air conditioner) when the switch is in a generally horizontal position, but which removes power to the thermostat when the float and switch move to a tilted position as a result of rising water in the auxiliary reservoir. However, the relatively high number of components used in this device, and the manner in which they must be arranged to perform properly, increase the overall cost of the device, including both manufacturing and installation costs, and limit the usefulness of the device to essentially one specific application. The reliance on moving parts will also limit the useful life of the device in the vast majority of applications.

Overall, the known devices for disabling climate control systems upon sensing the presence or accumulation of a liquid require numerous parts, are relatively expensive to manufacture, install and/or service, are tailored for specific, limited applications, and may also suffer from reliability problems. Such devices commonly employ air flow switches, numerous relays, wall panels, and complex circuit arrangements.

What is needed is an arrangement for disabling a climate control system or, more broadly, any type of electrical device upon sensing the presence or accumulation of water or some other liquid, where the device is easily and inexpensively produced and installed, both for new and retrofit applications, where the device performs reliably without moving parts, where the device can be easily reset after a "flood condition" is detected, and that is generally safe to use.

SUMMARY OF THE INVENTION

In order to solve these and other needs in the art, the inventor hereof has succeeded at designing and developing a liquid sensor that can be used to disable an electrical device, such as, for example, the thermostat for a climate control system, upon sensing an accumulation of water or some other liquid in the vicinity of the electrical device. This elegantly simple and inexpensive liquid sensor is suitable for use in virtually any application where disablement of an electrical device upon detecting a liquid is desired.

According to one aspect of the present invention, a system including an electrical device and a power source for the electrical device also comprises a circuit breaker that electrically connects the electrical device to the power source, and a sensor operatively connected to the circuit breaker. The sensor induces an excessive current through the circuit breaker upon sensing a predetermined level of liquid, thus causing the circuit breaker to remove power to the electrical device. The system may be of a type capable of producing or discharging a liquid, such as a climate control system, clothes washer, icemaker, or dehumidifier. The circuit breaker may be of a type that is resettable, or may instead comprise a replaceable fuse. The sensor preferably comprises a first terminal that is electrically connected to the same side of the circuit breaker as the electrical device, as well as a second terminal that is electrically connected to ground. The sensor also preferably comprises two conductors separated by a water permeable insulator.

According to another aspect of the present invention, a system including a control device that enables operation of the system when electric power is supplied to the control device and disables operation of the system when electric power is removed from the control device also comprises a circuit breaker through which the control device receives electric power, and at least a first sensor operatively connected to the circuit breaker. The sensor induces an excessive current through the circuit breaker upon sensing a predetermined level of liquid, thus causing the circuit breaker to remove power to the control device, thereby disabling operation of the system. In the inventor's most preferred embodiment, the system is a climate control system and the control device is a thermostat. The sensor is preferably configured to electrically short the circuit breaker to ground when the sensor is exposed to the predetermined level of liquid. The system may also comprise a second sensor operatively connected to the circuit breaker, also for inducing an excessive current through the circuit breaker upon sensing a predetermined level of liquid. The first and second sensors can be positioned at independent locations.

According to still another aspect of the present invention, a method for disabling an electrical device upon sensing a predetermined level of liquid comprises the steps of providing electric power to the electrical device through a circuit breaker, and inducing an excessive current through the circuit breaker upon detecting the predetermined level of liquid, wherein the circuit breaker removes power to the electrical device in response to the excessive current. The inducing step preferably includes electrically shorting the circuit breaker to ground, and even more preferably, shorting the circuit breaker to ground through a sensor having two conductors separated by a water permeable material. The method also comprises the steps of electrically connecting the circuit breaker between the electrical device and a power source, and electrically connecting one of the sensor's conductors to the circuit breaker and another of the sensor's conductors to ground.

While the principal advantages and features of the present invention have been explained above, a more thorough and complete understanding of the invention may be attained by referring to the description of the drawings and the detailed description of the preferred embodiments which follow.

DETAILED DESCRIPTION OF THE PREFERRED EMBODIMENTS

Figure 1:
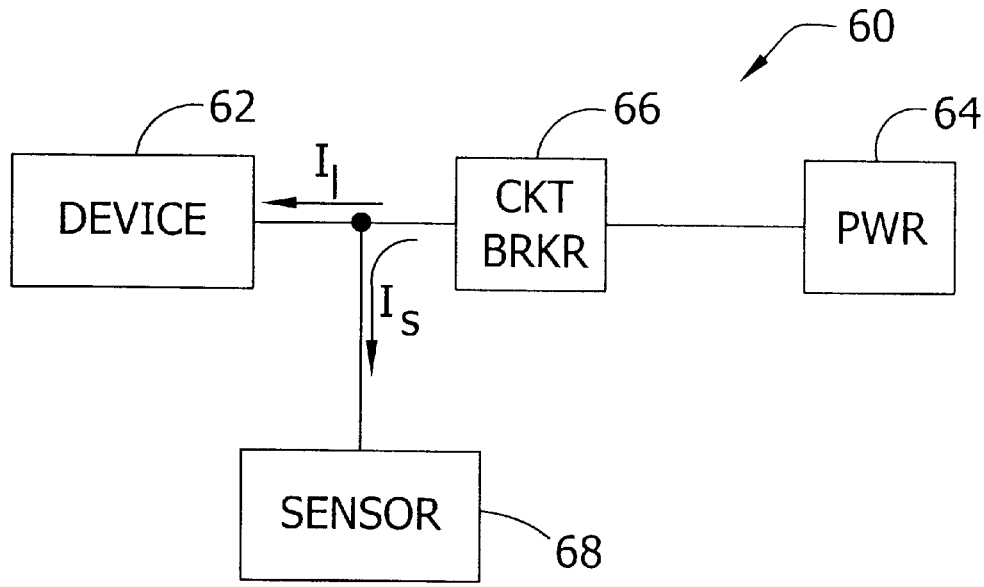
FIG. 1 is a block diagram of a system employing a liquid sensor according to the present invention.

An improved system for disabling an electrical device upon sensing a predetermined level of liquid is designated generally by reference character 60 in FIG. 1. As shown therein, the system 60 includes an electrical device 62 which receives power from a power source 64 through a circuit breaker 66. The circuit breaker 66 may comprise a resettable circuit breaker or a replaceable fuse. A liquid sensor 68 is connected to the same side of the circuit breaker 66 as the device 62. During normal operating conditions, the device 62 will draw a load current $I_L$ from the power source 64 through the circuit breaker 66. Accordingly, the circuit breaker 66 is preferably selected or configured such that its maximum current limit is slightly greater than $I_L$ or slightly greater than the maximum load current expected to be drawn by the device 62. When the current drawn through the circuit breaker 66 exceeds the maximum current limit, the circuit breaker will interrupt the connection between the device 62 and the power supply 64.

The power source 64 may be a typical 120 volt AC power source, or a low voltage (e.g., 24 volts) AC power source, or any other type of AC or DC power source. As shown in FIG. 1, when the sensor 68 senses a predetermined liquid level, the sensor draws a current $I_S$ that is greater than the maximum current limit of the circuit breaker 66, thus causing the circuit breaker 66 to trip and remove power to the electrical device 62. In this manner, the sensor 68 can be used to remove power to the electrical device 62 upon sensing the presence of a liquid. As explained below, the specific level of liquid required to activate the sensor can be readily adjusted when the sensor is constructed.

In view of the above, it should be understood that the teachings of the present invention can be applied to virtually any electrical device for removing power to the electrical device when the presence of a liquid or a predetermined liquid level is detected.

Figure 2:
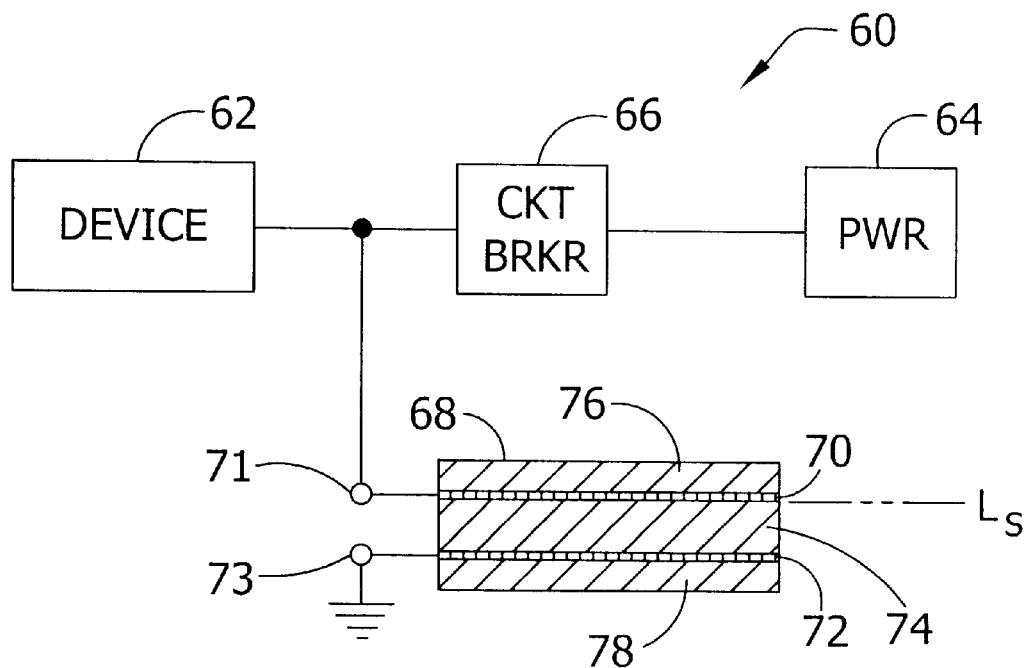
FIG. 2 is a block diagram illustrating one preferred construction of the liquid sensor shown in FIG. 1.

FIG. 2 illustrates one preferred construction of the sensor 68 of the present invention. As shown therein, the sensor 68 includes two conductors 70, 72 separated by a water permeable insulating material 74. The upper conductor 70 is connected to the same side of the circuit breaker 66 as the device 62 via a terminal 71, and the lower conductor 72 is connected to ground via a terminal 73. Thus, when water accumulates in the vicinity of the sensor 68 and rises to the level $L_S$, the water will permeate the water permeable material 74, thus creating a short condition between the two conductors 70, 72 and effectively connecting the circuit breaker 66 to ground. As a result, an excessive current will be induced through the circuit breaker 66, thus causing the circuit breaker 66 to trip or blow and remove power to the electrical device 62. As shown in FIG. 2, the lower conductor 72 of the sensor 68 is preferably connected to earth ground, or to the chassis ground for the electrical device 62. It should be understood, however, that to practice the teachings of the present invention, the lower conductor 72 need merely be connected to some point that will draw an excessive current through the circuit breaker 66, thus causing the circuit breaker 66 to trip or blow, when a short condition exists between the conductors 70, 72. Thus, as used herein, the term "ground" shall include any such point.

In this preferred embodiment, the conductors 70, 72 each comprise a conductive mesh material, and the water permeable layer 74 preferably comprises a foam material. Note that if the foam layer 74 has a tendency to lift or "wick" liquids upwardly, then the fluid level $L_S$ required to activate the sensor 68 may actually be lower than the level $L_s$ shown in FIG. 2. The preferred liquid sensor 68 also includes, as shown in FIG. 2, a top layer of non-conductive foam 76 to prevent objects from falling onto and inadvertently shorting the upper conductor 70 to other objects, as well as a bottom layer of foam 78 for elevating the lower conductor 72. Where desirable, the bottom layer of foam 78 can be omitted, such that the lower conductor 72 will constitute the bottom side of the sensor 68.

As should already be apparent, the particular fluid level $L_S$ required to activate the sensor 68 can be selected when the sensor 68 is constructed. For example, if the sensor 68 is to be activated when a water level of 0.2 inches is encountered, then the sensor 68 should be constructed with the upper conductor 70 positioned 0.2 inches above the bottom side of the sensor, assuming the middle foam layer 74 does not wick fluid upwardly. If the middle foam layer 74 does exhibit such a wicking ability, then the upper conductor 70 should be positioned at approximately the level to where the middle foam layer 74 will wick fluid when the sensor 68 is positioned in approximately 0.2 inches of water. When desirable to activate the sensor 68 as soon as any amount of liquid is encountered, the bottom layer of foam 78 can be omitted and the lower conductor 72 and the water permeable layer 74 can be constructed with a minimum thickness so as to position the upper conductor 70 as close to the bottom side of the sensor as possible. Alternatively, the sensor 68 can be rotated 90 degrees from its position shown in FIG. 2 so that the ends of both conductors 70, 72 form a part of the sensor's bottom side.

The bottom, middle and top foam layers are preferably generally non-conductive when dry. However, because at least the middle foam layer 74 is water permeable, the foam layer 74 will become conductive when permeated with water or some other conductive fluid.

Figure 3:
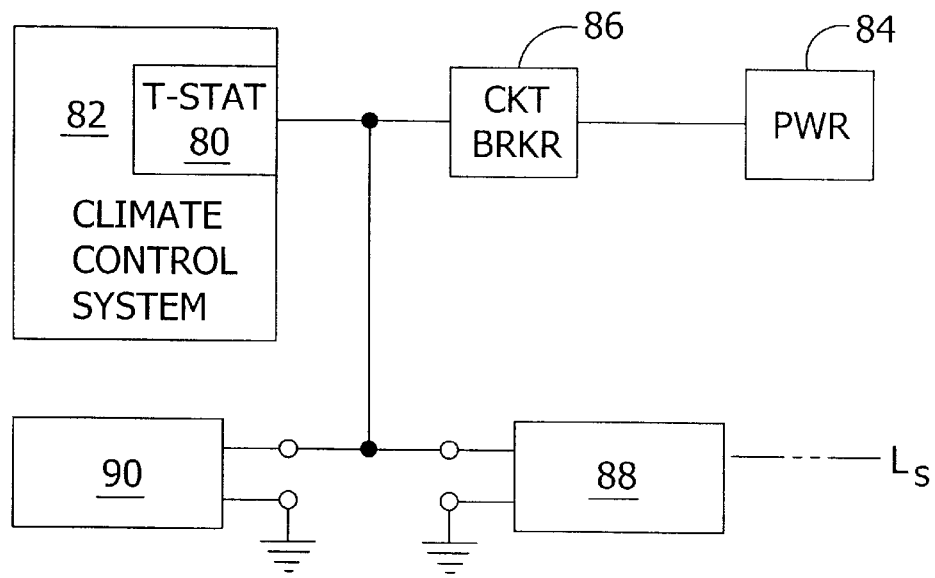
FIG. 3 is a block diagram of a climate control system employing multiple liquid sensors according to the present invention.

The teachings of the present invention can also be used with a control device, such as a thermostat for a climate control system, where disabling the control device will likewise disable any system controlled thereby. An example of this is shown in FIG. 3, where the thermostat 80 of a climate control system 82 receives power from a low voltage power source 84 through a circuit breaker 86. The power source 84 is preferably a 24 volt AC power source that is commonly used for control level signals in climate control systems. As shown in FIG. 3, at least one fluid sensor 88 is connected to the same side of the circuit breaker 86 as the thermostat 80. Upon encountering a predetermined liquid level $L_S$, the sensor 88 will effectively short circuit the circuit breaker 86 to ground, thus causing the circuit breaker 86 to trip or blow, thus disabling the thermostat 80 and, in turn, disabling the climate control system 82. In this embodiment, the maximum current limit of the circuit breaker 86 is preferably in the range of 0.5 to 1 amp.

As shown in FIG. 3, multiple sensors 88, 90 may also be used where detection of possible water leaks or accumulation in multiple locations is necessary or desired. For example, in a climate control system comprising both an air conditioner and a furnace, sensor 88 may be positioned at a location likely to be wet when the condensate drain line for the air conditioner is clogged, while the sensor 90 can be positioned at a location likely to be wet when a separate condensate drain line for the furnace is clogged. Although only two sensors are shown in FIG. 3, it should be understood that virtually any number of sensors can be employed, as desired. Moreover, although the present invention has been described primarily in connection with devices that are capable of producing or leaking water or other fluids, such as climate control systems, washing machines, icemakers, and dehumidifiers, the teachings of the present invention can also be used to protect these or other electrical devices from water emitted by other sources. For example, a water sensor could be positioned at a low spot on a basement floor or near a floor drain, and connected to a climate control system as described above with reference to FIG. 3, to disable the thermostat and climate control system when the basement floods due to a sewer line backup or some other cause.

Figure 4A:
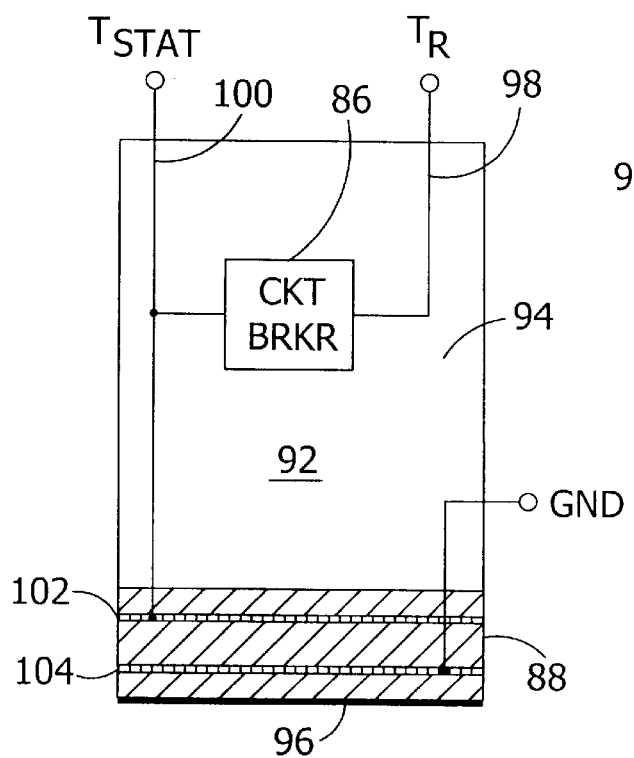
FIG. 4(a) is a front view of an adhesive strip to which various components are attached for conveniently installing the liquid sensor of the present invention in a system.
Figure 4B:
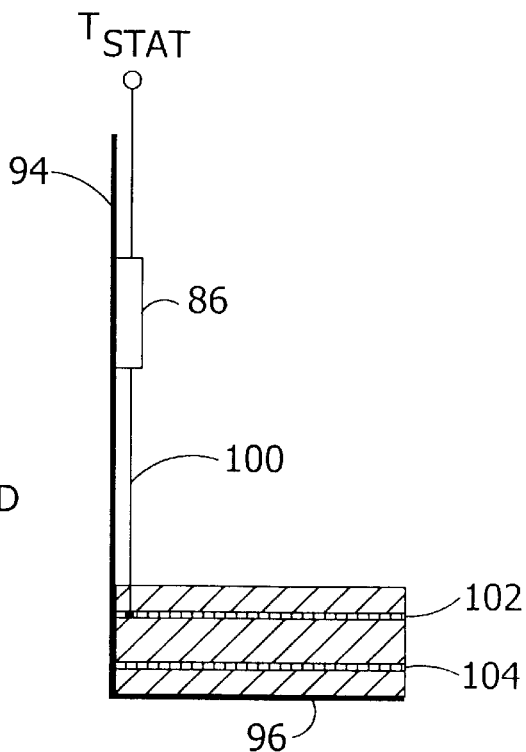
FIG. 4(b) is a side view of the adhesive strip and various components shown in FIG. 4(a).

The circuit breaker 86 and the sensor 88 shown in FIG. 3 are preferably both mounted to an adhesive strip 92, such as a strip of double-sided adhesive tape, for conveniently installing the circuit breaker 86 and the sensor 88 in a climate control system. As shown in FIG. 4(a), the adhesive strip 92 includes a vertically extending portion 94 to which the circuit breaker 86 is adhered, and a horizontally extending portion 96 to which the sensor 88 is adhered. An electrical lead (such as a piece of wire) 98 extends from one side of the circuit breaker to a terminal $T_R$, which is adapted for connection to a low voltage power supply (e.g., a 24 volt AC power supply), and a lead 100 extends from the other side of the circuit breaker 86 to a terminal $T_{STAT}$, which is adapted for connection to the power input terminal of a thermostat. The lead 100 is also attached to the upper conductor 102 of the sensor 88. A third lead 104 extends between the lower conductor 104 and a terminal $T_{GND}$, which is adapted for connection to a ground point. By mounting the sensor 88, the circuit breaker 86 and the leads 98, 100, 104 to the adhesive strip 92, these components can be quickly and easily attached to, for example, the rear and bottom chassis walls of a climate control system. The three terminals can then be quickly connected into the thermostat circuit to complete installation of the sensor.

To reset the system of the present invention after a predetermined level of liquid has been detected, the liquid sensor is first dried (or replaced) to eliminate the short condition between the upper and lower conductors. The sensor can then be returned to its original position or to a new position for detecting a subsequent "flood condition." To complete the reset process, the circuit breaker is reset, either by returning the circuit breaker to the "on" position, in the case of a resettable circuit breaker, or by replacing a fuse. The reset process can be performed by a HVAC serviceman or by any other qualified individual.

There are various changes and modifications which may be made to the invention as apparent to those skilled in the art. However, these changes and modifications are included within the teaching of the disclosure, and it is therefore intended that the invention be limited only by the scope of the claims appended hereto, and their equivalents.

What is claimed is:

1. In a climate control system including a thermostat and a power source for the thermostat, the improvement comprising a circuit breaker electrically connecting the thermostat to a line terminal of the power source, and a sensor operatively connected to the circuit breaker so as to electrically connect the circuit breaker to ground upon sensing a predetermined level of liquid in a vicinity of the sensor, thereby electrically connecting the line terminal of the power source to ground through the circuit breaker for opening the circuit breaker so as to disconnect the thermostat from the power source.

2. The system of claim 1 wherein the system is of a type capable of discharging a liquid.

3. The system of claim 2 wherein the circuit breaker is resettable.

4. The system of claim 2 wherein the circuit breaker is a replaceable fuse.

5. The system of claim 2 wherein the sensor comprises a first terminal electrically connected to the same side of the circuit breaker as the thermostat.

6. The system of claim 5 wherein the sensor comprises a second terminal electrically connected to ground.

7. The system of claim 6 wherein the sensor further comprises a first conductive surface electrically connected to the circuit breaker, a second conductive surface electrically connected to ground, and a water permeable insulator separating the first and second conductive surfaces.

8. A device for disabling a thermostat in a climate control system upon sensing a liquid in a vicinity of the device, the device comprising:

a circuit breaker having an input terminal for connection to a current source, an output terminal for connection to a positive terminal of the thermostat, and an electrical connection between the input terminal and the output terminal, the circuit breaker being configured to open the electrical connection between its input terminal and its output terminal when an electric current flowing through said electrical connection exceeds a predetermined current threshold; and a liquid sensor having a first terminal connected to the circuit breaker output terminal and a second terminal for connection to ground, the liquid sensor being configured to electrically connect its first terminal to its second terminal upon sensing a liquid, thereby causing a current greater than said predetermined current threshold to flow through the electrical connection of the circuit breaker and causing the circuit breaker to open the electrical connection between the input and output terminals and remove power from the positive terminal of the thermostat when the second terminal of the liquid sensor is connected to ground, the input terminal of the circuit breaker is connected to the current source, and the output terminal of the circuit breaker is connected to the positive terminal of the thermostat.

9. The device of claim 8 wherein the circuit breaker is resettable.

10. The device of claim 8 wherein the circuit breaker is a replaceable fuse.

11. A method for disabling a thermostat in a climate control system upon sensing a liquid, the thermostat having a positive terminal for connection to a current source, the method comprising the steps of:

electrically connecting an input terminal of a circuit breaker to the current source;

electrically connecting an output terminal of the circuit breaker to the positive terminal of the thermostat so as to electrically connect the positive terminal of the thermostat to the current source through the circuit breaker; and electrically connecting the output terminal of the circuit breaker to ground upon sensing a predetermined level of liquid, causing the circuit breaker to open the electrical connection between the positive terminal of the thermostat and the current source and thereby disable the thermostat.

12. The method of claim 11 wherein the step of electrically connecting the circuit breaker output terminal to ground includes electrically connecting the circuit breaker output terminal to a sensor having two conductors separated by a water permeable material.

* * * * *